June 2, 1942.    J. F. O'BRIEN    2,284,837
INTERCONNECTOR MEANS
Filed Dec. 19, 1939    2 Sheets-Sheet 1
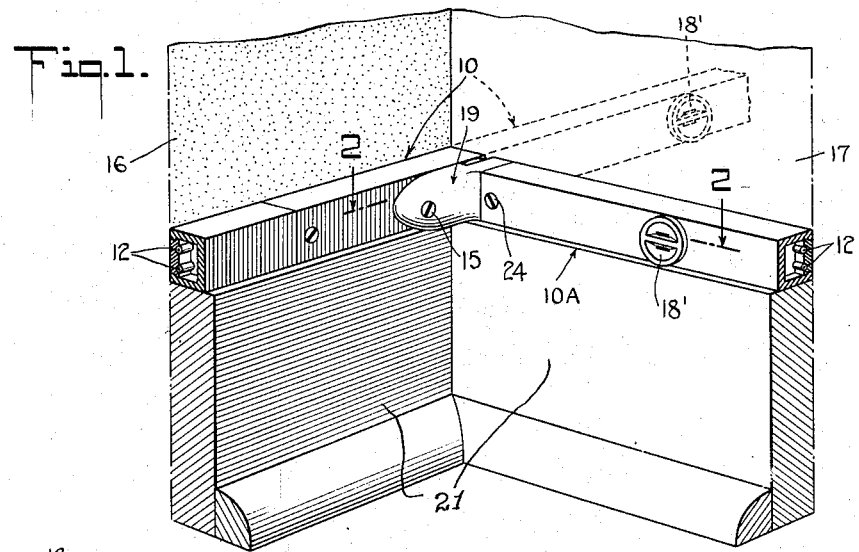
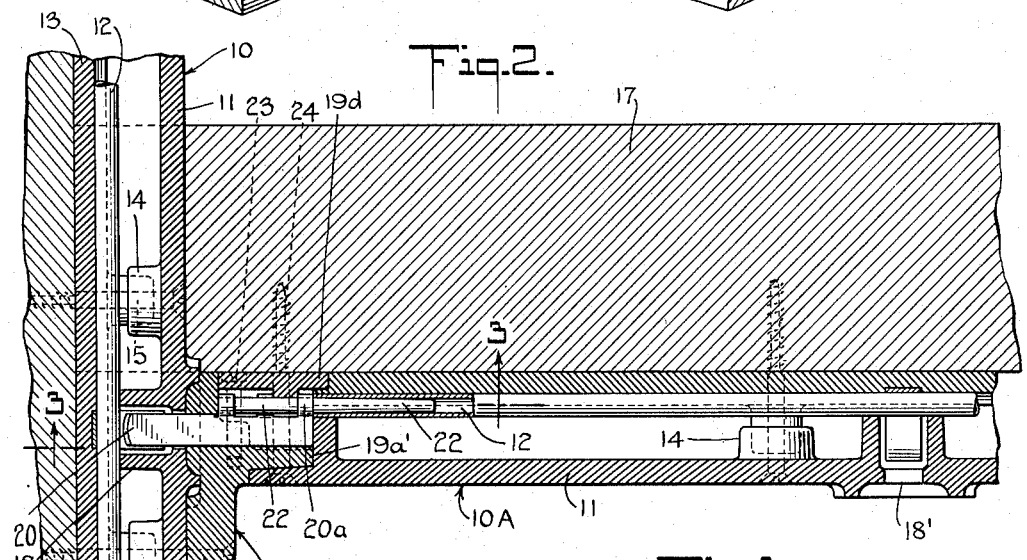
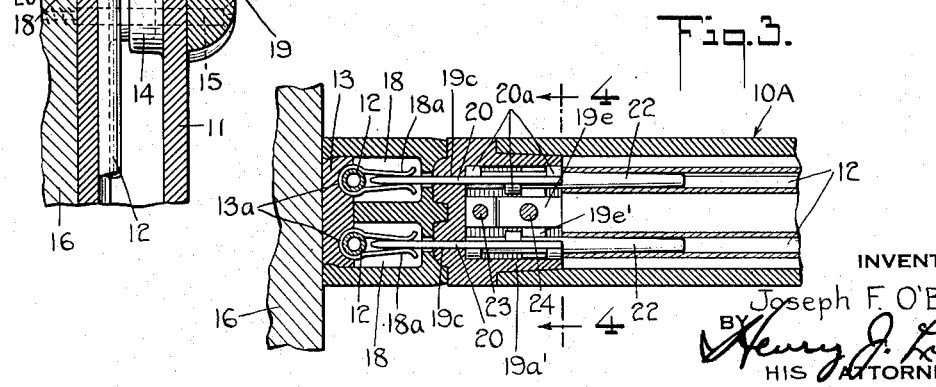
INVENTOR
Joseph F. O'Brien
BY
Henry J. Lucke
HIS ATTORNEY June 2, 1942.　　　J. F. O'BRIEN　　　2,284,837
INTERCONNECTOR MEANS
Filed Dec. 19, 1939　　　2 Sheets-Sheet 2
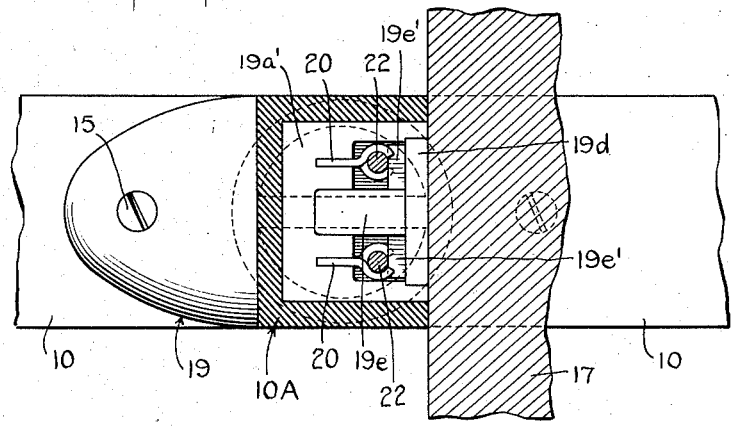
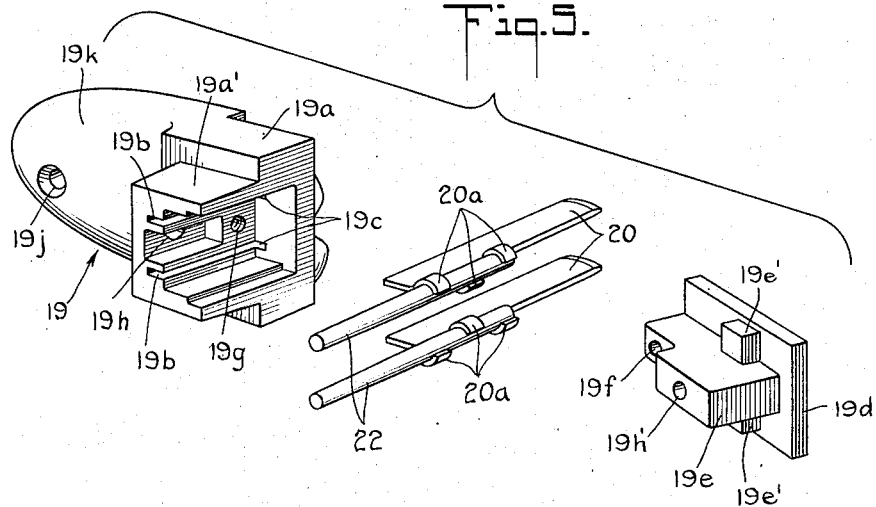
INVENTOR
Joseph F. O'Brien
Henry J. Lucke
ATTORNEY Patented June 2, 1942

2,284,837

UNITED STATES PATENT OFFICE 2,284,837

INTERCONNECTOR MEANS

Joseph F. O'Brien, Jersey City, N. J., assignor to John B. Pierce Foundation, New York, N. Y., a corporation of New York Application December 19, 1939, Serial No. 309,940

4 Claims. (Cl. 173—334.1)

The invention relates to interconnector means in the form of a connection fitting for mechanically and electrically interconnecting proximately disposed electrical conduit units of angular intersecting systems of such conduit units connected seriatim.

The invention is of advantage for interconnecting one seriatim electrical conduit system with another seriatim electrical conduit system, a unit, or part, of one system being disposed proximate a unit, or part, of the other system, as when installed on intersecting walls or partitions of a room or other space of a building structure.

The invention is applicable to original installations of the electrical conduit systems, and also, is applicable when an intersecting partition is constructed or placed after the original erection.

In general, the interconnector means comprises a body portion, and electrical conductors insulatedly mounted therein. The electrical conductors have respective terminals which project at one end of the body portion, and are preferably contoured to be received in clip terminals, or equivalent, of a suitable outlet of one of the associated electrical conduit units or parts. The said electrical conductors also carry elements, such as pins, or are provided with pin receiving means, for affording good electrical connection, respectively, with electrical conductors of tubular form, or otherwise having socket formations, of the other electrical conduit unit or part.

Preferably, the tubular ends or socket formations of the electrical conductors of such other associated electrical conduit unit or part are accessible at one end of the unit or part, such end of the unit or part having a female formation, the adjacent terminals of the interconnector means having male formation to be received within such female formation of the conduit unit or part, as afore-explained.

The interconnector means, further, includes a stub extension of the body portion projecting adjacent one end of the interconnector means, and angularly thereto, to afford adequate mechanical support of the interconnector means jointly with the electrical conduit unit or part with which it is thereat electrically and mechanically connected.

In the drawings:

Fig. 1 is a detail perspective view illustrating one manner of use of the invention, herein termed an interconnector, for affording mechanical and electrical interconnection of one electrical conduit assembly with another electrical conduit assembly.

Fig. 2 is an enlarged horizontal sectional view on line 2—2 of Fig. 1.

Fig. 3 is a detail vertical sectional view on line 3—3 of Fig. 2.

Fig. 4 is a detail, further enlarged, view on line 4—4 of Fig. 3.

Fig. 5 is an exploded view in perspective of the component parts of a preferred embodiment of the interconnector, illustrated generally in the preceding figures.

Referring to the drawings, the type of electrical conduit system indicated in the respective views comprises electrical conductor units, adapted to be mechanically and electrically connected in seriatim. A preferred type of such electrical conduit system is set forth and claimed in the copending application Serial No. 286,734, filed by Louis G. Morten and Joseph F. O'Brien on July 27, 1939, entitled Electrical unit. Characteristics of a component electrical conductor unit, see 10, Figs. 1 and 2, of the instant application, of such preferred system, are a housing 11, electrical conductors 12, 12, each having a length substantially that of the unit, closure means 13, or equivalent, having recesses 13a, 13a, or equivalent, for securing the electrical conductors 12, 12, in mutually spaced insulating positions, suitable elements 14, 14 extending interiorly of the housing 11 and provided with through openings registering with openings through the closure means or equivalent for receiving screws 15, 15, passing therethrough for securing the unit to any suitable support, such as a wall 16, partition 17, or the like, and electrical outlet means such as indicated 18, 18, see also Fig. 3.

As is illustrated in Figs. 1 and 2, an advantageous application of the interconnector, indicated generally 19, arises in the electrical interconnection of a conduit system installed upon, say a partition such as is indicated at 17, with a conduit system installed upon, say a wall such as is indicated at 16, of a building structure, the latter conduit system extending through a suitably formed opening in such partition 17, the plug-in outlet 18 of such latter conduit system being appropriately located at the juncture of such partition with such wall to afford mechanical and electrical reception by its clip-type outlet terminals 18a, 18a, respectively, of the projecting electrical terminals 20, 20, of the interconnector 19.

Appropriately, the electrical conductor system may serve as a molding, as, say, at the baseboard, see 21, Fig. 1, or as a chair molding, or dado, picture molding, wall-ceiling molding or the like. The individual conductor units, connected in seriatim forming the electrical conductor system may be optionally provided with electrical outlets 18' or equivalent for reception of electrical plugs or the like for connection with floor or table lamps, radios, electrical sewing machines, irons, ranges, toasters, broilers, washing machines, etc.

Referring now more particularly to the structure of the interconnector 19, as illustrated in the drawings, each of its stated electrical terminals 20, 20, see Figs. 4 and 5, has a body portion which is preferably flat, and is suitably secured to its associated rod-shaped conductor pin 22, as by provision of retaining fingers 20a, which may extend from one longitudinal edge of the body portion. The rod-shaped connector pins 22, preferably tapered at their free ends, are arranged for mechanical and good electrical connection at their free ends within the hollow tubular terminal portions of the electrical tubular conductors 12, 12, see Fig. 3, with respect to the adjacent electrical conductor unit, such as 10A, see Fig. 1. The stated terminal-pin assemblies are suitably housed within the hollow body portion 19a of the interconnector 19, preferably of electrical insulating material, or otherwise suitably insulatedly mounted therein, as by grooves 19b for receiving the longitudinal edges of the respective terminals 20, 20, the free ends of the terminals 20, 20 extending through the openings 19c, 19c, to suitably project beyond the housing portion 19a. The housing portion 19a is provided at one side with a suitable closure part 19d, and at another side 19a' is reduced in outer contour to be received within a female formation of the contiguous conductor unit 10A. The closure part 19d advantageously carries a filler part 19e arranged to be positioned intermediate the terminal-pin assemblies 20—22, and stop parts 19e', 19e', for limiting the terminal-pin assemblies 20—22, by limiting engagement intermediate fingers 20a, 20a, respectively.

The closure part 19d is adapted to be secured in position as by a screw 23, Fig. 2, passing through an opening 19f, the threaded end of the screw engaging the threaded walls of the tapped recess 19g. The opening 19h is adapted to receive a screw, see 24, Figs. 1 and 2, passing through an opening of the conductor unit 10A, and through perforation 19h' of the filler part 19e and of the closure part 19d, for rigid mechanical connection of the interconnector fitting 19 with the conductor unit 10, and for supporting them jointly relative to the partition 17, or its equivalent.

The opening 19j of the extension 19k of the interconnector 19 provides for passage therethrough of the screw 15 for attaining rigid mechanical connection with the conductor unit 10 and further, support of the interconnector unit and the conductor unit 10 jointly to the wall 16, or equivalent.

The faces of the openings 19c, 19c, preferably make a tight fit with the therethrough inserted electrical conductors 20, 20, to thereby afford firm support of the same, and to maintain the same in mutual parallelism when their free terminal portions are inserted into clip terminals such as the clip terminals 18a, 18a, or equivalent of the outlet 18, the limiting blocks 19e, 19e, cooperating to preclude displacement of the electrical conductors 20, 20, within their respective mounting grooves 19b, 19b, in the body portion 19a.

The interconnector 19, pursuant to the construction illustrated in the drawings, is readily assembled, namely by individually sliding the free edge of each electrical conductor 20, in its groove 19b, thence through its opening 19c for the desired extent of projection of its free terminal portion, its advance finger 20a determining such extent of projection by abutting engagement with the inner wall of the hollow body portion 19a, and the limiting blocks 19e', 19e', interposed between two fingers 20a, 20a, serving further to add rigidity of positioning of the conductor-pin assembly 20—22, and preventing endwise displacement thereof.

Whereas, I have described my invention by reference to specific forms thereof, it will be understood that many changes and modifications may be made without departing from the spirit of the invention.

I claim:

1. A connection fitting adapted for electrically and mechanically interconnecting angularly adjoining electric conduit units of respective angularly intersecting seriatim systems of electric conduit units, said connection fitting comprising, a body portion having substantially oppositely extending ends, one of said ends being shouldered and reduced in thickness to provide a male formation for mechanical interconnection with its associated electric conduit unit; electrical conductors insulatedly mounted in said body portion and having terminal portions which project from both of said oppositely extending ends thereof; said body portion having an integral stub extension projecting angularly from one side thereof at that one of its said ends which is opposite from said shouldered end of male formation, said stub extension being of approximately the same size as said body portion for securely anchoring said body portion to the electric conduit unit associated with the said end of the body portion from which said stub extension extends; and mechanical means for securing said stub extension to the last named electric conduit unit.

2. A connection fitting adapted for electrically and mechanically interconnecting angularly adjoining electric conduit units of respective angularly intersecting seriatim systems of electric conduit units, said connection fitting comprising, a body of insulating material, said body being provided along its length with an open recess of substantially channel formation; a wall blocking the channel of said recess at one end, the said channel being open at its other end for the reception of electrical conductor elements; a pair of mutually spaced, open channel slots formed in said body of insulating material at the bottom of said recess and extending through said end wall; electrical conductor elements disposed within said recess and having terminals protruding from said supporting body at opposite ends thereof, said conductor elements being each formed of interconnected separable parts of mutually different configurations, one of said separable parts fitting within a corresponding one of said open channel slots and, therewith, through said end wall, and the other of said separable parts being interconnected with the first named separable part and abutting against said end wall; an insert cover of insulating material fitted into said open recess and closing the same, said insert cover having inwardly projecting portions which prevent movement of the said conductor elements and insulate them one from the other, said projecting inner portions comprising lateral projections which bear against said conductor elements, and an intermediate projection which extends between said conductor elements; means securing said insert cover in place; and a stub extension projecting angularly from said body adjacent one of the said opposite ends thereof.

3. An electrical wiring system comprising two seriatim systems of interconnected electric conduit units; a connection fitting serving to electrically and mechanically interconnect said seriatim systems, angularly, one with the other; one of the electric conduit units, component to one of said seriatim systems, having a plug-in outlet; the said connection fitting having electric conductor elements insulatedly mounted within a body, the said electric conductor elements having sets of terminals disposed at opposite ends of said body, said connection fitting having one end abutting the said plug-in outlet of the said one seriatim system, with the sets of terminals thereof plugged into electrical connection with said plug-in outlet, and said connection fitting having an opposite end abutting an end of one of the electric conduit units of the other seriatim system, with the sets of terminals thereof electrically connected with the electric conductors of said abutting electric conduit unit, and said connection fitting having, further, a stub extension of said body projecting angularly therefrom adjacent said plug-in outlet and fitting against an electric conduit unit of said one seriatim system; and means mechanically interconnecting said stub extension with the said electric conduit unit against which it fits.

4. An electrical wiring system comprising two seriatim systems of interconnected electric conduit units; a connection fitting serving to electrically and mechanically interconnect said seriatim systems, angularly, one with the other; one of the electric conduit units, component to one of said seriatim systems, having a plug-in outlet; the said connection fitting having electrical conductor elements insulatedly mounted within a body, the said electric conductor elements having sets of terminals disposed at opposite ends of said body, said connection fitting having one end abutting the said plug-in outlet of the said one seriatim system, with the sets of terminals thereof plugged into electrical connection with said plug-in outlet, said connection fitting having an opposite end reduced in thickness, and shouldered, providing a male formation for interconnection with an end of one of the electric conduit units of the other seriatim system, said end of the electric conduit unit of the other seriatim system having a female formation for receiving the said male formation of the said connection fitting, the said male formation and the said female formation being mechanically interconnected, and the sets of terminals of said connection fitting being electrically connected with the electric conductors of the said one of the electric conduit units of the other seriatim system, and said connection fitting having, further, a stub extension of said body projecting angularly therefrom adjacent said plug-in outlet and fitting against an electric conduit unit of said one seriatim system; and means mechanically interconnecting said stub extension with the said electric conduit unit against which it fits.

JOSEPH F. O'BRIEN.